US009864750B2

(12) United States Patent
Tecu

(10) Patent No.: US 9,864,750 B2
(45) Date of Patent: Jan. 9, 2018

(54) OBJECTIFICATION WITH DEEP SEARCHABILITY

(71) Applicant: Konica Minolta Laboratory U.S.A., Inc., San Mateo, CA (US)

(72) Inventor: Kirk Steven Tecu, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 328 days.

(21) Appl. No.: 14/588,165

(22) Filed: Dec. 31, 2014

(65) Prior Publication Data

US 2016/0188612 A1 Jun. 30, 2016

(51) Int. Cl.
*G06F 17/30* (2006.01)

(52) U.S. Cl.
CPC .............. *G06F 17/30076* (2013.01)

(58) Field of Classification Search
CPC . G06F 3/04842; G06F 3/1242; G06F 17/3028
USPC .................. 707/756, 802, 809; 715/202, 235
See application file for complete search history.

(56) References Cited

U.S. PATENT DOCUMENTS

| 6,799,299 | B1 * | 9/2004 | Li ...................... G06F 17/2247 715/235 |
| 8,634,656 | B2 | 1/2014 | Yano |
| 2002/0016800 | A1 | 2/2002 | Spivak et al. |
| 2003/0098862 | A1 * | 5/2003 | Hunt ........................ G06T 17/00 345/418 |
| 2006/0085442 | A1 | 4/2006 | Fujiwara |
| 2013/0044959 | A1 * | 2/2013 | Mitchell ................ G06Q 30/02 382/217 |
| 2015/0046779 | A1 * | 2/2015 | Akselrod .............. G06F 17/241 715/202 |
| 2016/0110374 | A1 * | 4/2016 | Wetherall .......... G06F 17/30011 707/825 |

FOREIGN PATENT DOCUMENTS

| JP | 2006-120125 A | 5/2006 |
| JP | 2008-177851 A | 7/2008 |

OTHER PUBLICATIONS

Office Action in counterpart Japanese Patent Application No. 2015-255694 dated Jul. 4, 2017 (7 pages).

* cited by examiner

*Primary Examiner* — Hung T Vy
(74) *Attorney, Agent, or Firm* — Osha Liang LLP

(57) ABSTRACT

A method for objectifying non-text content within a non-native file includes objectifying an object of the non-text content by determining a tag for the object, the tag defining a portion of the object in native file format, and creating an objectified object including the object and the tag. The method further includes generating, based on the objectified object, metadata including composition information for the objectified object, at least part of the composition information being text data capable of being searched by a native application for the native file, and generating a new native file including the objectified object appended with the metadata.

18 Claims, 4 Drawing Sheets

OBJECTIFICATION WITH DEEP SEARCHABILITY

BACKGROUND

Native electronic files allow a user to edit documents easily with various options and functionalities. Sometimes, native files are converted into different file types (i.e., converted into non-native files). However, the editability of the document is typically reduced in non-native formats. To illustrate, a user may be able to edit individual cells of a table in a word processing document when using the native file. If, however, the user is using a non-native copy of the file, the user's ability to edit the table may be limited. For example, the user may be unable to edit individual cells, and may be limited to simply selecting a location on a page in which to place the entire table.

An example of a non-native file is a physical document. Physical documents are ubiquitous in homes, offices, and other environments. Many physical documents are printouts from an electronic document, such as from a word processing application of a computing device. Sometimes, a user may desire to edit a physical document using a computing device. To do so, the user may first need to scan the physical document with a scanner or multifunction printer so that a rasterized image can be analyzed and processed by software that can recognize objects on the scanned document. For example, common operations such as text recognition and conversion may be performed using optical character recognition (OCR) software. However, non-text objects are unrecognizable and uneditable. If the text in the image is not well-formed, the text may also be unrecognizable and uneditable. In both cases, the objects are typically treated as bitmap objects or converted to a vector format from the original scan, and are unrecognizable in their native format.

SUMMARY

In one aspect, according to one or more embodiments, a method for objectifying non-text content within a non-native file, the non-text content comprising an object, may comprise: objectifying the object of the non-text content by: determining a tag for the object, wherein the tag defines a portion of the object in native file format; and creating an objectified object comprising the object and the tag; generating, based on the objectified object, metadata comprising composition information for the objectified object, wherein at least part of the composition information is text data capable of being searched by a native application for the native file; and generating a new native file comprising the objectified object appended with the metadata.

In another aspect, according to one or more embodiments, a system for objectifying non-text content within a non-native file, the non-text content comprising an object, may comprise: a computer processor; and an objectifier that is executed on the computer processor and configured to: objectify the object of the non-text content by: determining a tag for the object, wherein the tag defines a portion of the object in native file format; and creating an objectified object comprising the object and the tag; generate, based on the objectified object, metadata comprising composition information for the objectified object, wherein at least part of the composition information is text data capable of being searched by a native application for the native file; and generate a new native file comprising the objectified object appended with the metadata.

In another aspect, according to one or more embodiments, a non-transitory computer readable medium comprising instructions for objectifying non-text content within a non-native file, the non-text content comprising an object, the instructions, when executed, being configured to: objectify the object of the non-text content by: determining a tag for the object, wherein the tag defines a portion of the object in native file format; and creating an objectified object comprising the object and the tag; generate, based on the objectified object, metadata comprising composition information for the objectified object, wherein at least part of the composition information is text data capable of being searched by a native application for the native file; and generate a new native file comprising the objectified object appended with the metadata.

Other aspects of the invention will be apparent from the following description and the appended claims.

DETAILED DESCRIPTION

Figure 1:
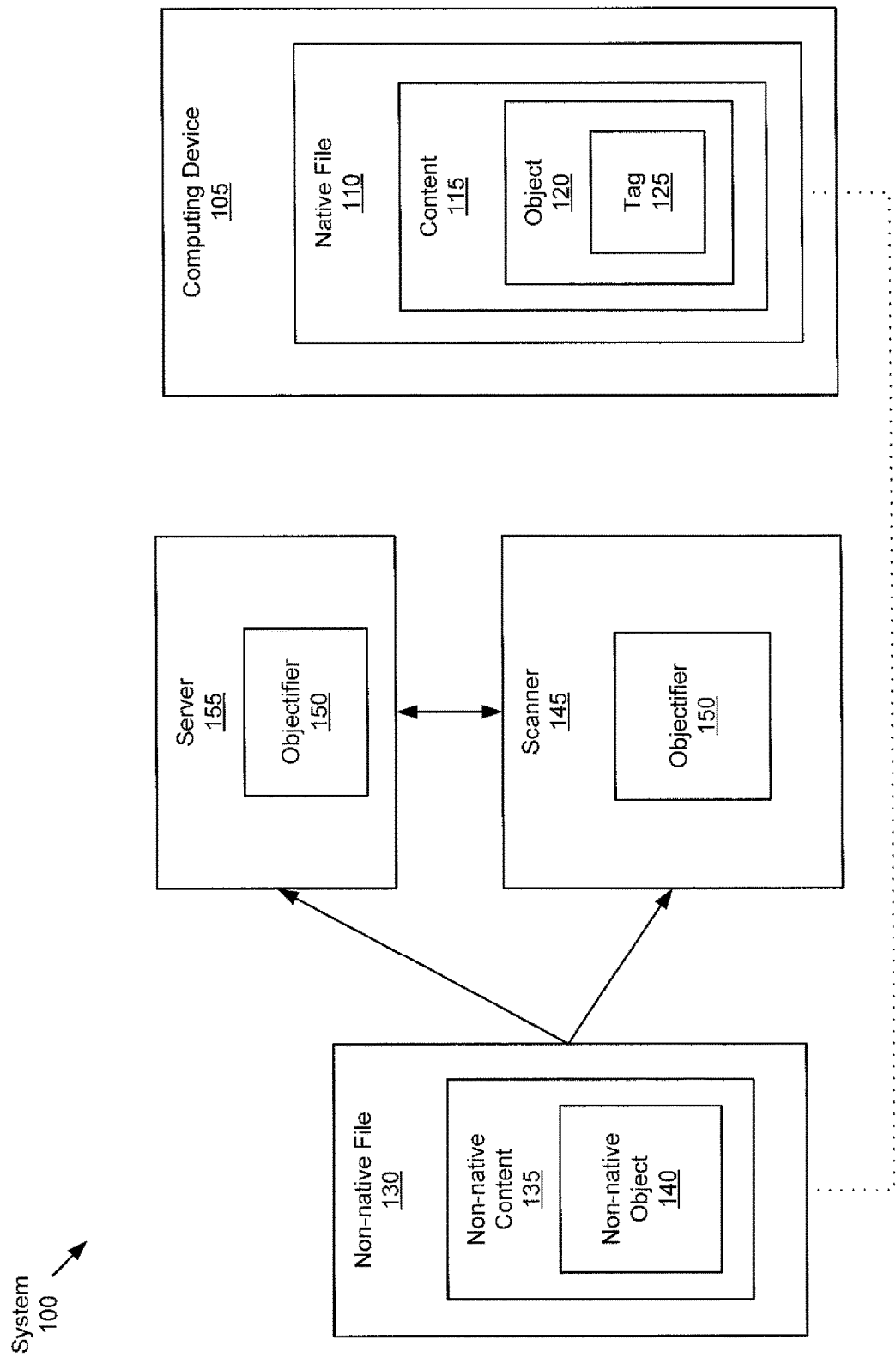
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for objectification (defining objects) to recognize non-native document objects in their native format. For example, if a user has access to a non-native file (e.g., a hardcopy printout of an electronic document), but not the native file, the user's ability to edit or search the document may be limited. One or more embodiments of the invention enable the user to create a new electronic document that is editable and deep searchable in native file format. Deep searchability enables pre-existing and/or built-in text search functionalities of the operating system and/or document programs to perform the search using common string descriptions of objects, such as images, charts, tables, graphs, pictures, etc.

According to one or more embodiments, a non-native file with an object is obtained. The object is objectified by determining a tag for the object and creating an objectified object with the object and the tag. Metadata may be generated based on the objectified object, and a new native file with the objectified object and the metadata is generated. The objectified object in the new native file can be edited natively, and the metadata is searchable.

Thus, one or more embodiments of the invention provide a document workflow that begins with a non-native file (e.g., a hardcopy printout or portable document format (PDF) file of an electronic document, or a scanned image of the hardcopy printout) and ends with a new electronic file with objectified non-text content having deep search metadata associated therewith. For example, according to one or more embodiments, a user may scan a hardcopy version of an electronic document, perform objectification on the scanned content, and create searchable metadata based on the recognized objects. The metadata may be string descriptions embedded as searchable, hidden text associated with and placed in proximity to the recognized objects. As a result, the user can obtain an electronic document that can be repurposed and/or deep searched with natural language queries. In one or more embodiments, "non-text content" may also encompass stylized text, graphical text, or other forms of text unrecognizable by conventional OCR software. In other words, "non-text content" may be a content that is not recognized as a text content when classifying the content into text or non-text.

FIG. 1 is a simplified schematic diagram showing an example of a system according to one or more embodiments of the invention. Specifically, FIG. 1 shows system (100) including computing device (105), native file (110), content (115), object (120), tag (125), non-native file (130), non-native content (135), non-native object (140), scanner (145), objectifier (150), and server (155). In one or more embodiments, computing device (105) may be any type of device capable of creating electronic files, such as a desktop computer, laptop computer, smartphone, tablet, etc. Computing device (105) may include many different components, such as a processor, memory, input devices, etc. (not shown). In one or more embodiments, computing device (105) may execute various programs/applications (not shown) that a user may utilize to create electronic documents. These programs/applications may be, for example, word processing programs, slide show programs, spreadsheet applications, note taking applications, etc.

These electronic documents may be used by computing device users to store, share, archive, and search information. Such documents are stored, temporarily or permanently, in files. Many different file formats exist. Each file format defines how the content of the file is encoded. In other words, based on the file format, the content of the file may be read and displayed. Some file formats are used primarily for creating and/or editing documents, while others are primarily for various other uses, e.g., sharing documents with others. Examples of file formats include, e.g., Office Open XML (OOXML), PDF, etc.

Sometimes, users may convert a document of one file format into another file format, such as converting an OOXML document into a PDF document. Additionally, users may print a physical copy of an electronic document. In so doing, aspects of the native file format may be lost. Typically these aspects are invisible to the user, but may have important consequences such as reducing the editing capabilities of the file. However, as will be discussed in detail herein, one or more embodiments of the invention can mitigate such consequences.

Continuing with FIG. 1, in one or more embodiments, native file (110) is an electronic document in the original file format in which the document was created. Native file (110) may be of any file format now known or later developed. Native file (110) may be stored on computing device (105) or any other suitable location. In one or more embodiments, native file (110) may be converted into another type of file, such as non-native file (130). Native file (110) includes data, such as content (115), that is displayed when a user views the native file using a program used to create the native file.

In one or more embodiments, content (115) may be any type of content found in electronic documents including, but not limited to: text, pictures, tables, charts, images, formulas, etc. In one or more embodiments, content (115) includes one or more objects (120). Object (120) may be text, a graphical image, or any other part of content (115) that is displayable, Graphical images may include bitmap-based images and vector based graphical images. For example, a graphical image may be stylized text (e.g., word art), chart, pictorial image, or other graphics. In the following explanation, a case where the content is determined as a text object is excluded from further explanation since conventional techniques, such as banalization, word segmentation and OCR techniques, are applied for such text object.

In one or more embodiments, object (120) that has been determined as a non-text object may be delimited by one or more hidden tags (125). Specifically, tag (125) may specify composition information for one or more objects, including formatting and type information. At least part of the composition information can be text data capable of being searched by a native application for the native file. Formatting describes how the object is displayed. Formatting describes how the object is displayed. Formatting may include color, size, shading, image file name (e.g., puppy.jpg), and other such information. Type refers to what the object is. For example, a type may be a particular kind of chart, word art, image, table, clipart, bulleted list, and other such types.

Continuing with tag (125), by way of example, a pie chart object (i.e., an object corresponding to a pie chart) may be delimited from the remainder of the file by a hidden start tag and a hidden end tag that specify pie chart. Within the pie chart object may be tags defining the size of each slice in the pie chart and the color of the slice. A bar graph object may be delimited from the remainder of the original file by a hidden start tag and a hidden end tag that specify bar graph. Text may be delimited by tags specifying font size, font name, font color and other attributes of the text. It will be apparent to one of ordinary skill in the art, having the benefit of this disclosure, that there are many possible tags and, as such, the invention should not be limited to the above examples.

In one or more embodiments, non-native file (130) is a copy of native file (110) that is in a different file format than native file (110). Non-native file (130) may be of any file format type. For example, in one or more embodiments, non-native file (130) is a printout or physical copy of native file (110), or a scanned image of the printout. In one or more embodiments, non-native file (130) may appear identical, or nearly identical to native file (110). However, when native file (110) was printed or converted to non-native file (130), some data may have been lost, such as tag (125). Non-native file (130) and native file (110) are linked by a dotted line in FIG. 1, indicating that they are the "same" file.

In one or more embodiments, non-native content (135) is the non-native copy of content (115). Like content (115), non-native content (135) may be any type of content including, but not limited to:, pictures, tables, charts, images, etc. In one or more embodiments, non-native content (135) includes one or more non-native objects (140). Non-native object (140) is the non-native copy of object (120). Importantly, non-native object (140) is not associated with any tags, as the tags were lost in the conversion process and/or printing.

In one or more embodiments, scanner (145) is a scanner or other device with scanning functionality, such as a multi-function printer (MFP). Scanner (145) may have many different components including, but not limited to: a processor, memory, displays, inputs, etc. Scanner (145) may include any functionality commonly associated with scanners and/or MFPs such as: optically scanning documents and converting the document to a digital image, performing Optical Character Recognition (OCR), rasterizing images, etc. Scanner (145) may produce documents of many different file types and/or resolutions. Scanner (145) may be communicatively connected to server (155) using wired and/or wireless connections. Optionally, scanner (145) may also be connected to other devices, such as personal computers, tablets, smartphones, etc.

In one or more embodiments, scanner (145) includes functionality to execute objectifier (150). Objectifier (150) is a program or module for objectifying objects within a non-native file. As shown in FIG. 1, objectifier (150) may execute on scanner (145) and/or on server (155). Specifically, objectifier (150) includes functionality to determine tags for an object, create an objectified object, generate metadata, and generate a new native file.

In one or more embodiments, objectifier (150) includes functionality to determine tags for an object in any suitable manner. The objects may be provided to objectifier (150) by the scanner, server, or other computing device, or may be detected by objectifier (150) in any manner now known or later developed. Once the objects are identified, objectifier (150) analyzes the objects to determine what tags may have been, or were, originally associated with the object when the object was part of the native file. In one or more embodiments, objectifier (150) may compare a variety of templates to the objects. Each template may represent one or more tags. If there is a match, or a near match, then the tags associated with that template may be used to objectify the object. In one or more embodiments, objectifier (150) may make a best guess as to what tags should be associated with the object. Alternatively, objectifier (150) may use any other suitable method to determine what tags should be associated with the object.

In one or more embodiments, objectifier (150) includes functionality to create an objectified object. The objectified object is similar, or identical, to the original object in the native file. The objectified object may be created by inserting tags into an electronic file at the appropriate locations. Alternatively, the objectified object may be created using any other object recognition or pattern matching methods now known or later developed.

In one or more embodiments, objectifier (150) includes functionality for creating metadata for the objectified object. Metadata for the objectified object may describe how objects are composed in the native file type, such as the type of object and formatting for the object, the location of the object, and/or any other aspects and/or descriptions of the object. For example, the location of each object may be specified by page number of the page in which the object is located and x and y coordinates on the page. In one or more embodiments, the metadata is not used to render the object for display. In other words, the metadata may be used exclusively for informational purposes, such as for searching. In one or more embodiments, the metadata is partially or completely hidden from the user.

In one or more embodiments, objectifier (150) includes functionality for generating a new native file. The new native file may be generated in any manner now known or later developed. Specifically, the new native file will include the objectified object. The new native file may include many or all of the aspects of the original native file (such as tags) that were lost when the native file was converted into a non-native file. In one or more embodiments, some other component may generate the new native file, such as other software executing on server (155) or scanner (145). As a result, the user is able to edit non-text content in the document without recreating the non-text content using the program (e.g., Microsoft Office program) that generated the original native file.

In one or more embodiments, server (155) is a server, rack, desktop computer, laptop computer, or other computing device capable of executing objectifier (150). Server (155) may be configured in many different ways and the invention should not be limited to the setup shown in FIG. 1.

Figure 2:
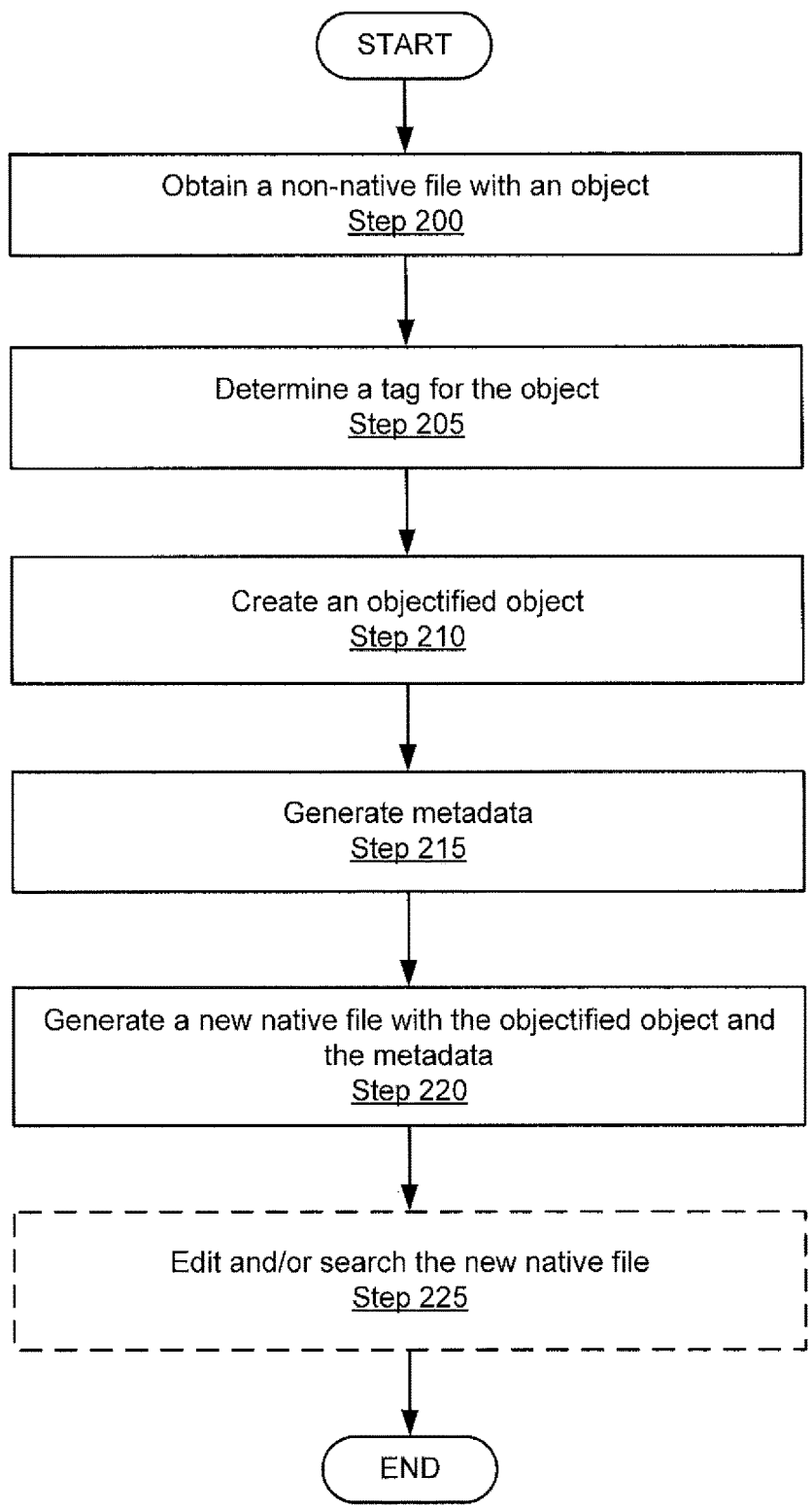
FIG. 2 shows a flowchart in accordance with one or more embodiments of the invention.

FIG. 2 shows a flowchart in accordance with one or more embodiments of the invention. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Further still, additional steps not shown may also be performed without deviating from the scope of the invention. Accordingly, the specific arrangement of steps shown in FIG. 2 should not be construed as limiting the scope of the invention.

In Step 200, a non-native file with an object is obtained. In one or more embodiments, the non-native file is a printout or physical copy of an electronic document. Specifically, the user in possession of the physical copy may not have access to the native electronic original/copy of the document, but would like to edit the document on his or her computer without manually recreating the electronic document. Thus, in one or more embodiments, the non-native file may be obtained from a scanner. Alternatively, the non-native file may be an electronic file in a file format different from the native file. In one or more embodiments, the non-native file may be obtained from memory, a data repository, or any other suitable source.

In one or more embodiments, the user may provide input regarding the suspected native file type. For example, if the user believes that a physical document was originally created with "Word Processing Program A," the user may provide that information as additional input. This additional input may be used to aid in determining what tags should be associated with the object in Step 205, or what type of file should be created.

In Step 205, a tag is determined for the object. The tag(s) define at least a portion of the objects and may be determined in any suitable manner. In one or more embodiments, templates may be compared to the object to determine if the object is similar to any known tagged objects. Alternatively, the tags may be determined based on a best guess algorithm, input from the user, or any other suitable method.

In Step 210, an objectified object (e.g., OOXML object) is created. The objectified object includes the object and one or more tags for the object. In other words, the objectified object is a partial, or full, recreation of the object as in the native file. The objectified object will enable a user to edit the objectified object with more functionality than a "plain" object. For example, without utilizing the present invention, if the object is a circle, then, when the object is scanned, the circle may be stored as a rasterized image and would only allow the user access to basic editing functionality, such as selecting a location on the page, or simple resizing. With the objectified circle, the user may be able to edit the color of the circle, adjust the line thickness, add patterns, etc.

In Step 215, metadata is generated. All objectified content may be analyzed with known search algorithms to add the metadata in proximity to the object. The metadata may be generated in any manner now known or later developed. The metadata may be based on the objectified object. In one or more embodiments, the metadata may describe aspects of the object, such as object type, size, color, location, shape, etc.

In Step 220, a new native file is generated with the objectified object and the metadata. The new native file may be generated in any manner now known or later developed. The new native file is a new electronic document that was generated using the non-native file, and enhanced with the tags and metadata that were determined for, or using, the objectified object. Advantageously, due to the objectified object and the metadata appended thereto, the new native file allows the user to access much more functionality, such as deep searching and increased edibility for the objectified object.

In Step 225, the new native file is edited and/or searched. As shown by the dotted lines, Step 225 is optional, and may be performed at any time, using any computing device. The editing and/or searching may be performed in any manner now known or later developed.

Figure 3:
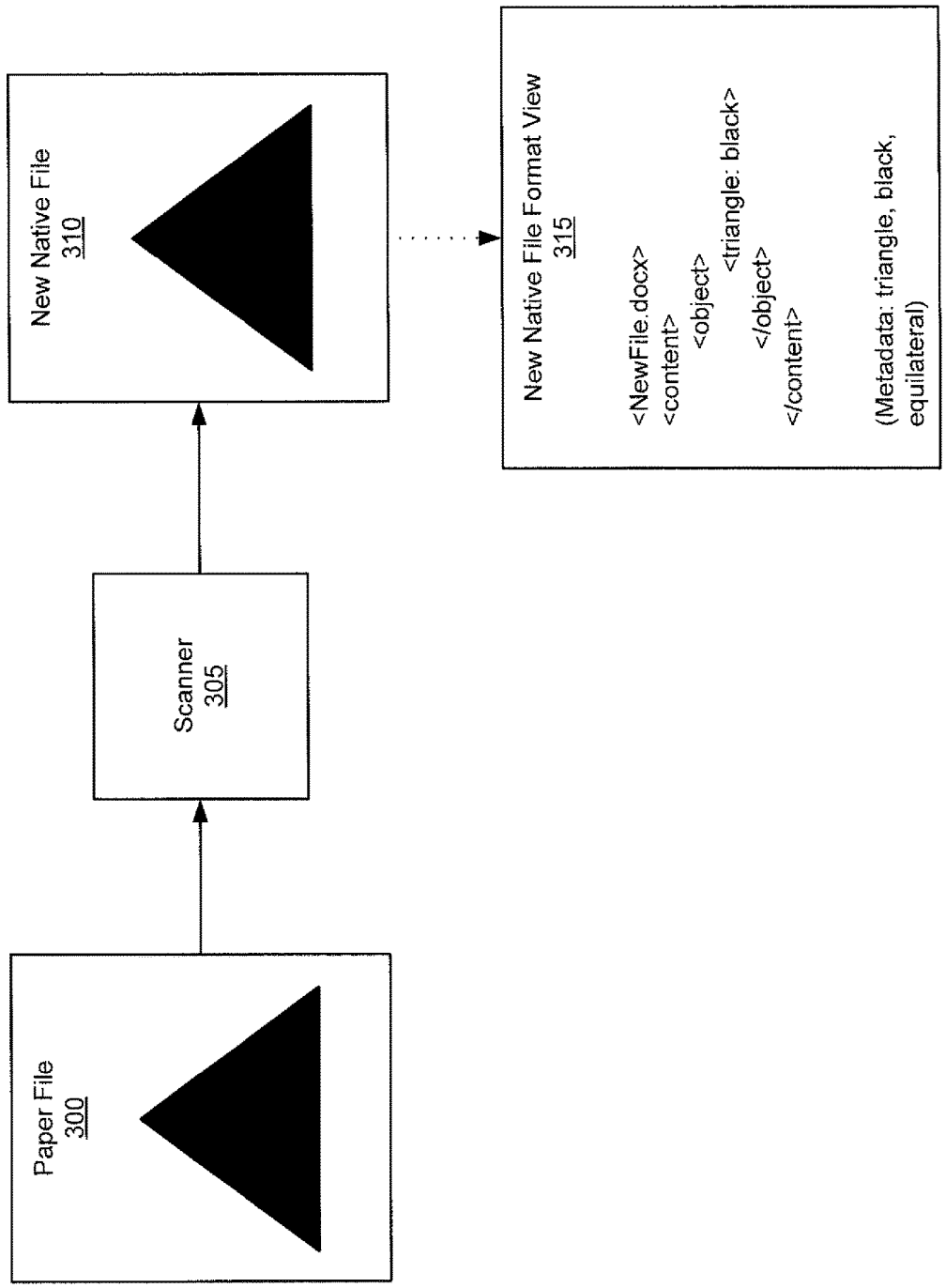
FIG. 3 shows an example in accordance with one or more embodiments of the invention.

FIG. 3 shows an example in accordance with one or more embodiments of the invention. The example is for explanatory purposes only and not intended to limit the scope of the invention. Specifically, FIG. 3 shows the process converting paper file (300) to an electronic document with deep searchability and improved editing capabilities. To begin, a user is in possession of paper file (300). Paper file (300) is a sheet of paper with a large black triangle printed in the center of the page. The user wishes to edit paper file (300) on her computer, but does not want to take the time to manually recreate the file. Although the user knows that paper file (300) was originally created as an electronic document using a computer, the user does not know where the electronic copy is.

Thus, the user places paper file (300) in scanner (305), scans the file, and creates a new native file (310). After paper file (300) is scanned, the scanner (305) detects that an object is present: the black triangle. The scanner (305) objectifies the black triangle by determining what tags should be associated with the black triangle for the native file format chosen. The tags can be seen in new native file format view (315). Specifically, scanner (305) determined that the tag <triangle: black> should be associated with the black triangle. Thus, the tag <triangle: black> will be included in new native file (310)—although the tag is invisible to the user. This tag will enable the user to edit the black triangle in new native file (310) with as many features and functions as were present when the black triangle was originally created in the native file (which the user does not have access to).

Additionally, scanner (305) uses the objectified content to generate metadata about the object. Specifically, the metadata in this example describes the object as: triangle, black, equilateral. However, these keywords may be arbitrary defined and can be changed or enhanced as to better capture what the user may search for to find the particular type of object. Additional details with respect to how such keywords are defined and associated with the recognized object may be found in U.S. Patent Application Publication No. 2014/0258258, which is incorporated by reference in its entirety herein. This metadata is embedded in new native file (310) and is invisible to the user. However, the user may then search new native file (310) using the terms in the metadata (typically, invisible text is discoverable via standard app/OS search tools). Thus, if the user does not know where she saved new native file (310), she could search all documents in her computer for the terms "equilateral black triangle" and new native file (310) would appear in the search results, and likely be a top "search hit" with this unique set of search terms.

Figure 4:
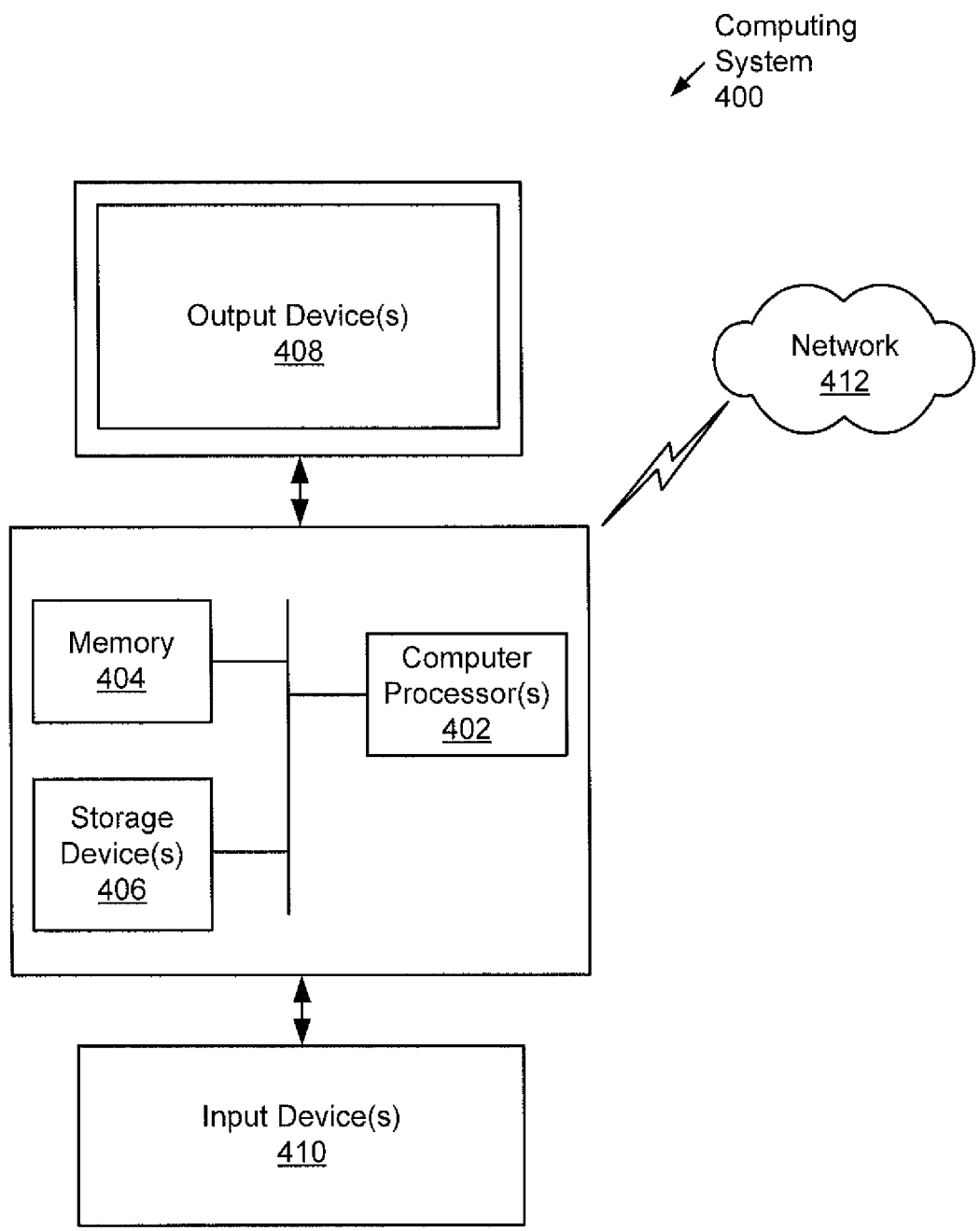
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a native file from an image, comprising:
    identifying a non-text object within the image and a formatting attribute of the non-text object;
    determining a tag for the non-text object by comparing the non-text object with a plurality of templates comprising a plurality of tags, wherein the tag corresponds to a matching template, and wherein the tag specifies a type of the non-text object and the formatting attribute of the non-text object in a format of the native file;
    generating metadata comprising composition information comprising the type and the formatting attribute of the non-text object, wherein at least part of the composition information is text data that is searchable by a native application for the native file to identify the non-text object within the native file; and
    generating the native file as an electronic document comprising:
        a markup comprising the tag specifying the type and the formatting attribute of the non-text object; and
        the metadata.

2. The method of claim 1, wherein the native file is an Office Open XML file.

3. The method of claim 1, wherein the markup is editable natively, and wherein the metadata is searchable.

4. The method of claim 1, wherein the non-text object is a graphics object and wherein the metadata describes a location of the non-text object in the image.

5. The method of claim 1, further comprising:
    receiving, from a user, the format for the native file, wherein determining the tag is based in part on the format.

6. The method of claim 1, wherein the image is obtained from a scanner.

7. A system for generating a native file from an image, comprising:
    a memory; and
    a computer processor connected to the memory that:
        identifies a non-text object within the image and a formatting attribute of the non-text object;
        determines a tag for the non-text object by comparing the non-text object with a plurality of templates comprising a plurality of tags, wherein the tag corresponds to a matching template, and wherein the tag specifies a type of the non-text object and the formatting attribute of the non-text object in a format of the native file;
        generates metadata comprising composition information comprising the type and the formatting attribute of the non-text object, wherein at least part of the composition information is text data that is searchable by a native application for the native file to identify the non-text object within the native file; and
        generates the native file as an electronic document comprising:
            a markup comprising the tag specifying the type and the formatting attribute of the non-text object; and
            the metadata.

8. The system of claim 7, wherein the native file is an Office Open XML file.

9. The system of claim 7, wherein the markup is editable natively, and wherein the metadata is searchable.

10. The system of claim 7, wherein the non-text object is a graphics object and wherein the metadata describes a location of the object in the image.

11. The system of claim 7, wherein the computer processor also:
    receives, from a user, the format for the native file, wherein determining the tag is based in part on the format.

12. The system of claim 7, further comprising:
    a scanner configured to obtain the image.

13. A non-transitory computer readable medium comprising instructions for objectifying non-text content within a non-native file, the non-text content comprising an object, the instructions, when executed, being configured to:
    identifies a non-text object within the image and a formatting attribute of the non-text object;
    determines a tag for the non-text object by comparing the non-text object with a plurality of templates comprising a plurality of tags, wherein the tag corresponds to a matching template, and wherein the tag specifies a type of the non-text object and the formatting attribute of the non-text object in a format of the native file;
    generates metadata comprising composition information comprising the type and the formatting attribute of the non-text object, wherein at least part of the composition information is text data that is searchable by a native application for the native file to identify the non-text object within the native file; and
    generates the native file as an electronic document comprising:
        a markup comprising the tag specifying the type and the formatting attribute of the non-text object; and
        the metadata.

14. The non-transitory computer readable medium of claim 13, wherein the native file is an Office Open XML file.

15. The non-transitory computer readable medium of claim 13, wherein the markup is editable natively, and wherein the metadata is searchable.

16. The non-transitory computer readable medium of claim 13, wherein the non-text object is a graphics object and wherein the metadata describes a location of the non-text in the image.

17. The non-transitory computer readable medium of claim 13, the instructions further configured to:
    receive, from a user, a format for the native file, wherein determining the tag is based in part on the format.

18. The non-transitory computer readable medium of claim 13, wherein the image is obtained from a scanner.

* * * * *